US012579782B2

(12) United States Patent
Liu et al.

(10) Patent No.: US 12,579,782 B2
(45) Date of Patent: Mar. 17, 2026

(54) METHOD FOR IMAGE PROCESSING

(71) Applicant: Dell Products L.P., Round Rock, TX (US)

(72) Inventors: Jinpeng Liu, Shanghai (CN); Tianxiang Chen, Shanghai (CN); Zijia Wang, Weifang (CN); Jiacheng Ni, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 398 days.

(21) Appl. No.: 18/128,708

(22) Filed: Mar. 30, 2023

(65) Prior Publication Data

US 2024/0290071 A1 Aug. 29, 2024

(30) Foreign Application Priority Data

Feb. 28, 2023 (CN) .......................... 202310183393.3

(51) Int. Cl.
*G06V 10/764* (2022.01)
*G06V 10/25* (2022.01)
*G06V 10/74* (2022.01)
*G06V 10/82* (2022.01)

(52) U.S. Cl.
CPC ............ *G06V 10/764* (2022.01); *G06V 10/25* (2022.01); *G06V 10/761* (2022.01); *G06V 10/82* (2022.01)

(58) Field of Classification Search
CPC ...... G06V 10/25; G06V 10/82; G06V 10/761; G06V 10/764; G06V 10/806
See application file for complete search history.

(56) References Cited

U.S. PATENT DOCUMENTS

| | | | | |
|---|---|---|---|---|
| 11,599,754 | B2* | 3/2023 | Soryal ................... | G06F 18/285 |
| 11,762,998 | B2* | 9/2023 | Kuta ...................... | G06N 3/045 |
| | | | | 726/22 |
| 2019/0238568 | A1* | 8/2019 | Goswami .............. | G06F 21/566 |
| 2021/0150273 | A1* | 5/2021 | Mustafi ............... | G06F 18/2148 |

OTHER PUBLICATIONS

Grosse, et al. (Adversarial perturbations against Deep Neural Networks for Malware classification) (Year: 2016).*
Khrulkov, et al. (Art of singular vectors and universal adversarial perturbations). (Year: 2018).*

(Continued)

*Primary Examiner* — Daniel G Mariam
(74) *Attorney, Agent, or Firm* — Ryan, Mason & Lewis, LLP

(57) ABSTRACT

Embodiments of the present disclosure provide a method for image processing. The method comprises extracting a target region in an image, and determining hidden vectors of the image based on the target region. The method further comprises generating a first classification result for the image based on the hidden vectors, obtaining a second classification result for the image from an image classification model, and determining trustworthiness of the image based on the first classification result and the second classification result. By using the method, a more flexible framework suitable for different applications can be provided. The framework not only can support machine learning models based on different algorithms, but also can specify data distribution more accurately. In addition, a method for independently detecting adversarial attacks is provided, thus improving the security of image detection.

20 Claims, 6 Drawing Sheets

(56)          References Cited

OTHER PUBLICATIONS

Y. Li et al., "A Review of Adversarial Attack and Defense for Classification Methods," The American Statistician, Jan. 4, 2022, 17 pages.

D. Kalaria et al., "Detecting Adversaries, yet Faltering to Noise? Leveraging Conditional Variational AutoEncoders for Adversary Detection in the Presence of Noisy Images," arXiv:2111.15518v2, Dec. 9, 2021, 12 pages.

U. Hwang et al., "PuVAE: A Variational Autoencoder to Purify Adversarial Examples," arXiv:1903.00585v1, Mar. 2, 2019, 7 pages.

N. Papernot et al., "Deep k-Nearest Neighbors: Towards Confident, Interpretable and Robust Deep Learning," arXiv:1803.04765v1, Mar. 13, 2018, 18 pages.

N. Dilokthanakul et al., "Deep Unsupervised Clustering with Gaussian Mixture Variational Autoencoders," arXiv:1611.02648v2, Jan. 13, 2017, 12 pages.

J. Raghuram et al., "A General Framework For Detecting Anomalous Inputs to DNN Classifiers," arXiv:2007.15147v3, Jun. 17, 2021, 27 pages.

N. Papernot et al., "Distillation as a Defense to Adversarial Perturbations against Deep Neural Networks," IEEE Symposium on Security & Privacy, arXiv:1511.04508v2, Mar. 14, 2016, 16 pages.

N. Carlini et al., "Defensive Distillation is Not Robust to Adversarial Examples," arXiv:1607.04311v1, Jul. 14, 2016, 3 pages.

T. Wang et al., "Dataset Distillation," arXiv:1811.10959v3, Feb. 24, 2020, 14 pages.

U.S. Appl. No. 17/954,536 filed in the name of Jinpeng Liu et al. on Sep. 28, 2022, and entitled "Detection of Adversarial Example Input to Machine Learning Models."

U.S. Appl. No. 18/105,924 filed in the name of Jinpeng Liu et al. on Feb. 6, 2023, and entitled "Method, Device, and Computer Program Product for Verifying Classification Result."

* cited by examiner

400

500

METHOD FOR IMAGE PROCESSING

RELATED APPLICATION

The present application claims priority to Chinese Patent Application No. 202310183393.3, filed Feb. 28, 2023, and entitled "Method for Image Processing," which is incorporated by reference herein in its entirety.

FIELD

Embodiments of the present disclosure relate to the field of image processing, and in particular, to a method, an electronic device, and a computer program product for image detection.

BACKGROUND

Machine learning/deep learning is a core technology of artificial intelligence, which solves problems that many conventional algorithms cannot solve, and plays an increasingly important role in numerous fields. With the application of machine learning/deep learning technology in many important fields (such as automatic driving, identity verification, and security monitoring), its security has also attracted extensive attention.

SUMMARY

Embodiments of the present disclosure provide a method, an electronic device, and a computer program product for image processing.

In a first aspect of the present disclosure, a method for image processing is provided. The method comprises extracting a target region in an image, and determining hidden vectors of the image based on the target region. The method further comprises generating a first classification result for the image based on the hidden vectors, obtaining a second classification result for the image from an image classification model, and determining trustworthiness of the image based on the first classification result and the second classification result.

In a second aspect of the present disclosure, a device for image processing is provided. The device includes a processor and a memory, wherein the memory is coupled to the processor and stores instructions that, when executed by the processor, cause the device to perform actions, the actions including extracting a target region in an image, and determining hidden vectors of the image based on the target region. The actions also include generating a first classification result for the image based on the hidden vectors, obtaining a second classification result for the image from an image classification model, and determining trustworthiness of the image based on the first classification result and the second classification result.

According to a third aspect of the present disclosure, a computer program product is provided. The computer program product is tangibly stored on a non-transitory computer-readable medium and comprises machine-executable instructions, wherein the machine-executable instructions, when executed by a machine, cause the machine to perform steps of the method in the first aspect of the present disclosure.

BRIEF DESCRIPTION OF THE DRAWINGS

By description of example embodiments of the present disclosure, provided in more detail herein with reference to the accompanying drawings, the above and other objectives, features, and advantages of the present disclosure will become more apparent. In the example embodiments of the present disclosure, the same reference numerals generally represent the same elements.

DETAILED DESCRIPTION

Figure 1:
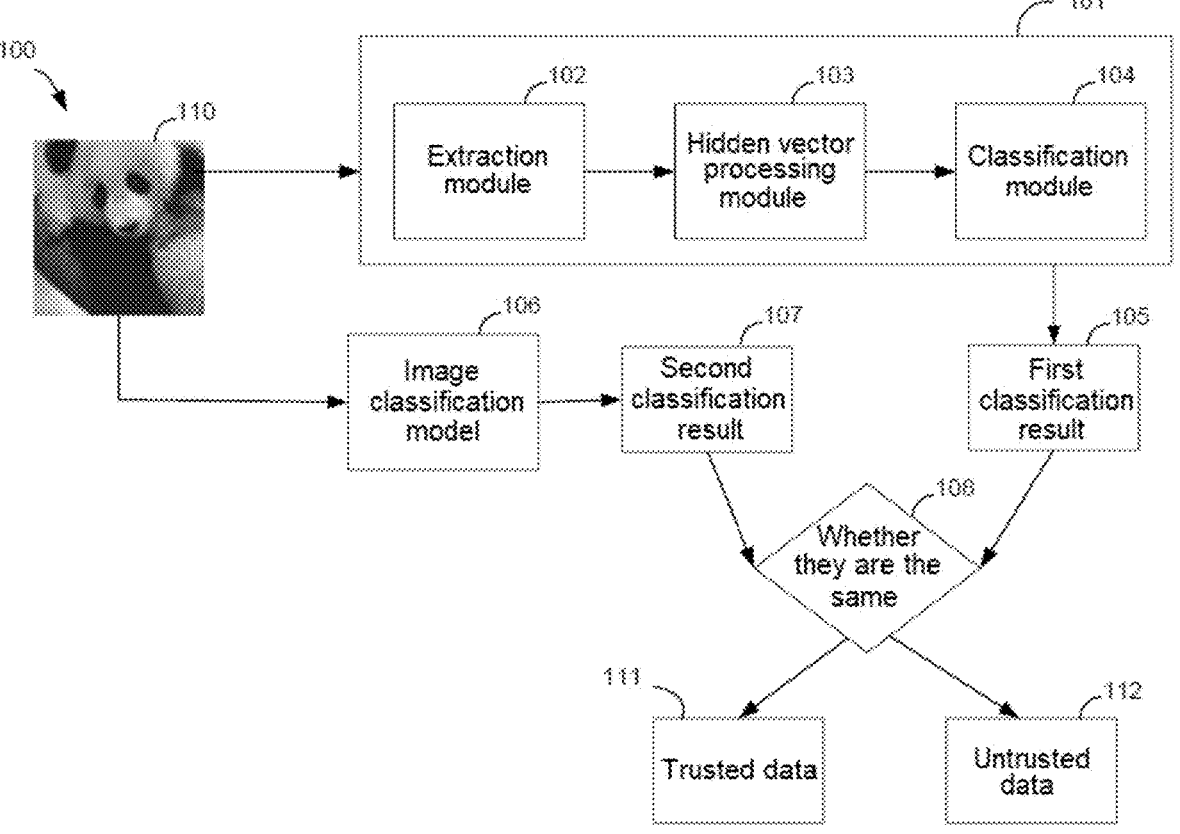
FIG. 1 illustrates a schematic diagram of an environment in which a device and/or a method according to embodiments of the present disclosure can be implemented.

Illustrative embodiments of the present disclosure will be described in more detail below with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below. In addition, all specific numerical values herein are examples, which are provided only to aid understanding, and are not intended to limit the scope.

Adversarial attacks are one of the most serious threats to the security of machine learning/deep learning applications today. Adversarial examples are examples with very small perturbations carefully crafted by attackers. Such perturbations cannot be detected by human eyes, but can lead to degradation of machine learning/deep learning models, such as misclassification. For example, adding small perturbations to an image of which image content is a panda, such as noise, clutter and other disturbances in the image, may eventually lead to misjudgment or misclassification by an image processing model, such as identifying the panda in the image as "gibbon."

In another example, an attacker may apply small perturbations to a "speed limit 30 km/h" road sign next to a road, such as shadows of branches and trunks with specific angles and directions, mud spots and stains at specific positions, etc. on the road sign. However, an image processing system in a self-driving car that passes the road sign may identify the "speed limit 30 km/h" road sign as a "speed limit 100 km/h" road sign due to these small perturbations, which can lead to serious safety accidents and endanger personal and property safety. In addition, self-driving cars may also fail to accurately identify license plates, road signs, roadblocks, pedestrians, etc. due to adversarial attacks with small perturbations.

At present, certain known methods for identifying adversarial attacks often require a large amount of computation, and general edge devices or Internet of Things devices cannot match corresponding computing/memory requirements, thereby making these detection schemes unable to be deployed in edge devices or Internet of Things devices with limited computing power. In addition, since a large amount of computation will lead to long detection time and high delay, it is not meaningful for real-time applications of online learning (such as automatic driving) even if the detection is successful.

Moreover, image processing models based on different algorithms or machine learning models often have different detection standards for images to be detected. For example, in an image processing model example based on a Gaussian Mixture Variational Autoencoder (GMVAE) and a KNN (K-Nearest Neighbors) algorithm, more accurate classification results can be detected. However, this image processing model requires more computation and longer processing time, so that this image processing model is more suitable for devices such as cloud server applications with more powerful performance.

In another aspect, in an image processing model example based on GMVAE and Bayesian inference, the model is less accurate for detection. Therefore, the model is less in computation and more suitable for edge computing devices such as smart mobile phones, driverless cars, etc. Therefore, different applications and usage scenarios have different detection standards for images, and there is a need to help different users customize image detection solutions for different applications and scenarios.

Adversarial attacks not only attack deep learning models, but also attack machine learning models. For example, in image processing models based on GMVAE and VAE, such models are applicable to deep learning models for image classification. In other machine learning models for audio processing, text processing, malware detection, intrusion detection, and performance optimization, data comes from different collection points and are not related to each other, and adversarial attacks may perturb these data, so that detection of the adversarial attacks in these examples is needed.

In some examples of adversarial attacks, image distribution is not a natural distribution, such as road signs and license plates, so it is difficult to find such a natural distribution only from a well-organized training data set. Thus, it is necessary to incorporate domain-specific knowledge of experts, users and other people into image processing models, which can improve the accuracy of detection and identification. In addition, there is a need to detect adversarial attacks in images independently from existing image classification models respectively.

At least to address the above and other potential problems, embodiments of the present disclosure provide a method for image processing. The method comprises extracting a target region in an image, and determining hidden vectors of the image based on the target region. The method further comprises generating a first classification result for the image based on the hidden vectors, obtaining a second classification result for the image from an image classification model, and determining the trustworthiness of the image based on the first classification result and the second classification result. By using the method, a more flexible framework suitable for different applications can be provided. The framework not only can support machine learning models based on different algorithms, but also can combine prior knowledge in a specific field to specify data distribution more accurately. In addition, a method for independently detecting adversarial attacks is provided, thus improving the security of image detection.

Fundamental principles and several example embodiments of the present disclosure will be described in detail below with reference to the accompanying drawings. FIG. 1 illustrates an environment 100 in which a device and/or a method according to embodiments of the present disclosure can be implemented. It should be understood that the number and arrangement of assemblies, elements, and models illustrated in FIG. 1 are examples only, and different numbers and different arrangements of assemblies, elements, and models may be included in environment 100. End users can easily implement a detection framework by choosing different building blocks in different steps according to their application needs.

As shown in FIG. 1, environment 100 includes image processing model 101, extraction module 102, hidden vector processing module 103, classification module 104, first classification result 105, image classification model 106, second classification result 107, trusted data 111, untrusted data 112, and input data 110.

In FIG. 1, input data 110 is an image that may contain adversarial attack data, which may include any image content, any dimension and size, and any image format type, and the present disclosure is not limited in this regard. As an example, in the present disclosure, input data 110 is an image of which image content is a panda.

Additionally or alternatively, in some embodiments, input data 110 may also be data such as video, audio, and text that may contain adversarial attack data, and corresponding adversarial attack data may perturb video data, perturb audio data, and perturb text data, and the present disclosure is not limited in this regard.

In input data 110, an attacker may use a variety of adversarial attack algorithms to process and perturb input data 110 to generate disturbances that are imperceptible to human eyes but can be detected by processing models or classification models, and finally affect the judgment of the processing models or classification models. The general principle of these adversarial attack algorithms is to utilize an optimization algorithm to find the minimum perturbation of each feature in an original feature space, so that final aggregated perturbation is large enough to push the decision boundary of the processing models or classification models:

$$x': D(x, x') < \eta, f(x) = y, f(x') \neq f(x) \tag{1}$$

where x is input data 110 that does not contain adversarial attack data, x' is input data 110 that contains adversarial attack data, and $\eta$ is applied perturbing data. In order to make distribution $D(x, x') < \eta$ small enough to be imperceptible to human eyes but large enough such that classification result $f(x') \neq f(x)$, an attack algorithm must be able to find an appropriate perturbation direction, so that the perturbations can accumulate rather than counteract each other, and try to use as many features as possible.

As an example, in the present disclosure, FGSM (Fast Gradient Sign Method) may be used as an example of an adversarial attack algorithm. FGSM includes using the same gradient descent in a classification model to find an appropriate rising perturbation direction, and approving the perturbation in a first hidden layer, so that all dimensions in x are available for attacking. Since input data x and corresponding parameter matrix $w^T$ are very high-dimensional, even if perturbation $\|p\|$ is very small, accumulated $\|w^r \rho\|$ is easily large enough so that classification result $f(x') \neq f(x)$.

For example, the input data can be denoted as $f(x) = \sigma$ $(w^r x)$, and the data after perturbation is added can be denoted as $f(x') = f(x+\sigma) = \sigma(w^r(x+\rho)) = \sigma(w^r x + w^r \rho)$. FGSM can first determine the minimum perturbation direction, that is, when features $\rho$ and $\nabla w^T$ are $\rho \| \nabla w^T$ in the same direction, $f(x')$ increases the fastest, and then perturbation can be applied to x.

Input data 110 may then be input to image processing model 101. Image processing model 101 may be a processing model capable of digitally processing input data such as images according to the present disclosure and based on deep learning models, machine learning models, or both applications, and the present disclosure is not limited in this regard.

Examples of applications based on deep learning models and machine learning models may include, but are not limited to, one or more of the following: PCA (Principle Component Analysis), PPCA (Probabilistic PCA), kernel PCA, FA (Factor Analysis), AE (Auto-Encoder, including but not limited to denoising AE, shrinkage AE, sparse AE, etc.), manifold learning, MDS (Multi-Dimensional Scaling), ISOMap, MVU (Maximum Variance Unfolding), LLE (Local Linear Embedding), Laplacian Eigenmaps, VAE (Variational Auto-Encoder), GAN (Generative Adversarial Network), Multi-Layer Perceptron (MLP), recurrent neural network model, recursive neural network model, deep convolutional network model (CNN), deep generative model (DNN), etc., and the present disclosure is not limited in this regard. In the present disclosure, as an example, image processing model 101 may be a model that has been trained to have image processing capabilities based on multiple deep learning models and machine learning models.

According to embodiments of the present disclosure, image processing model 101 can be implemented in various devices with computing capabilities, such as personal computers, server computers, hand-held or laptop computers, vehicle-mounted electronic devices, wearable electronic devices, mobile devices, unmanned aerial vehicles, auto-driving cars, smart home devices, consumer electronics, server computer systems, mainframe computer systems, or distributed cloud computing environments including any of the above. It should be noted that the above-mentioned examples of image processing model 101 and the devices implementing image processing model 101 are only illustrative and non-limiting. Image processing model 101 may also include more applications, and the devices implementing image processing model 101 may also include more devices, and the present disclosure is not limited in this regard.

Image processing model 101 may include extraction module 102. Extraction module 102 may extract target data to be processed in input data 110. For example, in FIG. 1, extraction module 102 may remove background image data from input data 110 and only retain processed target data "panda" itself.

Extraction module 102 can also determine the range of a target region to be extracted based on an image processing model type adopted in current image processing model 101 or different types of algorithms. For example, when an algorithm needs to perform linear computation on hidden vectors in an image (for example, traverse from one embedding to another embedding, or combine two embeddings into another new embedding), continuous hidden vectors are thus needed.

For example, when a machine learning model adopted by image processing model 101 is GMVAE and KNN or Bayesian inference is used, extraction module 102 can embed all extracted features into continuous hidden vectors, so that the distance between input data 110 with perturbed data and original input data can be observed intuitively. As an example, in some embodiments, extraction module 102 may remove redundant regions around a target region of input data 110, and only retain the complete and continuous target region itself.

In another aspect, when a method or machine learning model adopted by image processing model 101 is PCA, FA, or AE, or when used for malware detection, intrusion detection, or system optimization, extraction module 102 can only extract a partial and discrete target region. In some embodiments, extraction module 102 may only retain a few pixels in the target region, such as only retaining pixels required to constitute the contour of the target region and removing the remaining pixels, so as to further reduce the amount of data to be computed.

In some embodiments, extraction module 102 can also perform dimensionality reduction on input data 110, so as to map data points in an original high-dimensional space to a low-dimensional space. In some embodiments, extraction module 102 may also reduce information such as color channels of an input image, thereby simplifying subsequent computation and identifying perturbing data.

Additionally or alternatively, in an example where input data 110 is a video, extraction module 102 may only extract key frames in the video, so as to reduce subsequent computation. Additionally or alternatively, in an example where input data 110 is audio, extraction module 102 may only extract part of audio components in the audio.

According to embodiments of the present disclosure, extraction module 102 can reduce the dimensionality of an original feature space, and extract as few features as possible for further processing, which can effectively block adversarial attack features. However, in another aspect, features extracted by extraction module 102 are also sufficient and will not affect subsequent classification accuracy. It should be noted that the above examples of an extraction method of the input data by extraction module 102 are only illustrative and not limiting, and extraction module 102 may also include more extraction methods, and the present disclosure is not limited in this regard.

The extracted target region data may then be fed to hidden vector processing module 103 via extraction module 102. Hidden vector processing module 103 can determine hidden vectors in the target region data based on the target region data.

The image distribution of input data 110 with adversarial attack data is generally unnatural compared with image distribution without adversarial attack data, such as not conforming to normal distribution or Gaussian mixture distribution. However, currently known algorithms for defending or detecting adversarial attacks focus on how to find the natural distribution of normality samples. This approach is difficult to implement because it is difficult to find such an unnatural distribution in a training data set as well as adversarial examples in adversarial training.

In currently known training data, the data are typically organized in an orderly manner, that is, the distribution of all categories is balanced. In practical applications, the distribution of different categories is not so balanced. In the context of automatic driving, for example, the probability of an "under construction" warning traffic sign appearing may be much lower than that of a speed limit sign. For speed limit signs, however, the probability of a 30-km or 120-km speed limit sign appearing may be much lower than that of a 60-km speed limit sign.

Therefore, hidden vector processing module 103 can assign a plurality of reference truth labels associated with target region data to the target region data, and wherein the plurality of reference truth labels have been obtained by capturing and marking sample data features in a training sample set based on specific context by hidden vector processing module 103, instead of directly classifying the target region data or embedding labels into input of conditional GAN or conditional VAE.

As an example, in the context of taking an image of an animal in a wildlife park, hidden vector processing module 103 may perform feature extraction, capturing, and marking on image elements such as "panda," "gibbon," and "tiger" that appear in the image, so as to obtain a plurality of reference truth labels associated with these image elements, and then apply the plurality of reference truth labels to the target region data.

Then, hidden vector processing module 103 may set the probability that the target region data may be a panda to 60%, and set the probability that the target region data may be a tiger to 10%, based on the prior knowledge that the animal image is captured in a region where vegetarian animals such as pandas appear, rather than in a region where carnivores such as tigers appear. Hidden vector processing module 103 can support users to specify a data distribution more accurately for their application data. Such a data distribution helps to improve detection accuracy.

Subsequently, hidden vector processing module 103 may feed the label probability that hidden vectors belong to a plurality of reference truth labels and the hidden vectors themselves as intermediate data to classification module 104. Classification module 104 may perform final classification on target region data based on these intermediate data. A classification method of classification module 104 may be based on various deep learning models or machine learning models, such as KNN algorithm, Bayesian inference algorithm, CNN, and residual neural network.

As an example, the present disclosure may use Bayesian inference as the classification method of classification module 104, and the algorithm may be expressed as follows:

$$\mu_k = \frac{1}{N_k} \sum_{i=1}^{N_k} X_{ki} \tag{2}$$

$$\Sigma_k = \frac{1}{N_k} \sum_{i=1}^{i=N_k} (X_{ki} - \mu_k)(X_{ki} - \mu_k)^T \tag{3}$$

where k is a label in a hidden vector, and k can be 1 to 10 in the context of a speed limit sign as an example. $N_k$ is the number of hidden vectors of training samples in a training set, and $N = \Sigma N_k$ is the total number of example samples in the training set. For convenience of illustration, a Modified National Institute of Standards and Technology (MNIST) handwritten digital data set is taken as an example. In this MNIST example, $N_1 = N_2 = \ldots = N_{10} = 5,000$, and $N = \Sigma N_k = 50,000$. It should be noted that this is only illustrative and not limiting. $\mu_k$ is a sample mean of labels k in hidden vectors, and $\Sigma_k$ is a sample variance of labels k in the hidden vectors. After classification module 104 obtains $\Sigma_k$, $\Sigma_k^{-1}$ can be computed.

Through the above classification process, image processing model 101 can obtain first classification result 105, illustratively denoted as kc, for the target region via classification module 104. At the same time, image processing model 101 obtains second classification result 107 generated by another image classification model 106.

For example, image classification model 106 may be a GMVAE model. Image classification model 106 can classify input data 110 in parallel and compute $$P_k = \left| \frac{X - \mu_k}{\Sigma_k} \right|,$$

where X represents hidden vectors of the input image, $\mu_k$ is the sample mean of labels k in training set hidden vectors, $\Sigma_k$ is the sample variance of labels k in the training set hidden vectors, and $P_k$ is the probability of belonging to label k. Second classification result 107 of image classification model 106 for input data 110 may be $k_D$, and $$k_D = \underset{k}{\arg\min} P_k.$$

Image processing model 101 can then compare 108 first classification result 105 $k_C$ with second classification result 107 $k_D$. If first classification result 105 kc is inconsistent with second classification result 107 $k_D$, that is $k_C \neq k_D$, image processing model 101 can report to a user or system that input data 110 is untrusted data 112, that is, input data 110 includes adversarial attack data, and there is the possibility that the input data is tampered with by others or applied with adversarial attacks. On the contrary, if first classification result 105 $k_C$ is consistent with second classification result 107 $k_D$, image processing model 101 can report to the user or system that input data 110 is trusted data 111, and there is no possibility that the input data is tampered with by others or applied with adversarial attacks.

For example, if image processing model 101 classifies input data 110 as "panda," and image classification model 106 classifies the same input data 110 as "gibbon," image processing model 101 can judge that input data 110 is untrusted data 112. On the contrary, if the judgment results are the same, input data 110 is trusted data 111. Additionally or alternatively, in some embodiments, image processing model 101 can also compute the matching degree scores of first classification result 105 and second classification result 107 with reference truth labels, and determine whether input data 110 is trusted data based on whether the scores reach a matching degree threshold defined by a user. The matching degree threshold can be any numerical value defined by the user. For example, if the matching degree scores of first classification result 105 and second classification result 107 with the reference truth labels all reach 80% of the numerical value defined by the user, then it can be considered that the first classification result is consistent with the second classification result.

Figure 2:
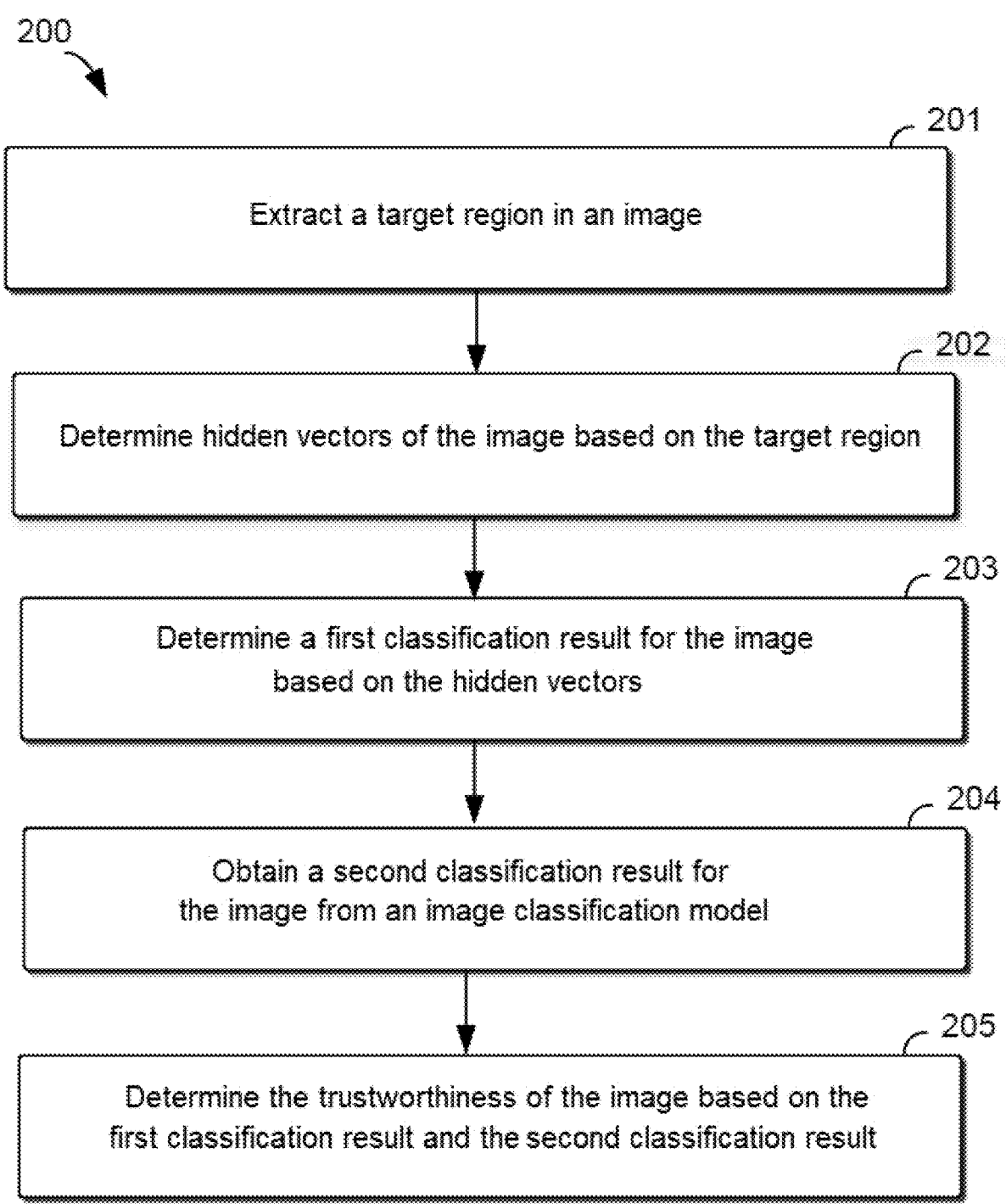
FIG. 2 illustrates a flow chart of a method for image processing according to embodiments of the present disclosure.

FIG. 2 illustrates a flow chart of a method 200 for image processing according to embodiments of the present disclosure.

As shown in FIG. 2, at block 201, image processing model 101 can extract a target region in an image. Depending on a device environment, an algorithm used, computing time required, and other factors of current image processing model 101, image processing model 101 can adaptively extract the target region.

In some examples, for example, if current image processing model 101 is based on a depth learning model, or if current image processing model 101 is located in a device with strong computing power, such as a supercomputer and a server, or if the current computing process can handle long processing time, image processing model 101 can extract a complete target region.

In some examples, for example, if current image processing model 101 is based on a machine learning model, or if current image processing model 101 is located in a terminal device with low computing power, such as an unmanned aerial vehicle, a smart phone, and an unmanned vehicle, or if the current computing process needs to be processed immediately or instantaneously, image processing model 101 can extract part of the target region.

At block 202, image processing model 101 may determine hidden vectors of the image based on the target region. For example, image processing model 101 can generate hidden vectors associated with the target region based on various known or unknown algorithms or models such as PCA, PPCA, FA, and VAE. The present disclosure does not impose any restrictions on the method of determining the image hidden vectors.

At block 203, image processing model 101 may then generate a first classification result for the image based on the determined hidden vectors. Image processing model 101 can determine the probability that the hidden vectors belong to each reference truth label based on the reference truth labels formed by data that have been trained in a specific training set and prior knowledge.

For example, in the context of speed limit signs, hidden vector processing module 103 in image processing model 101 can capture and mark each digital element in numbers "0" to "9" appearing on the speed limit signs, so as to obtain a plurality of reference truth labels associated with these digital elements, and then apply the plurality of reference truth labels to the target region data. Additionally or alternatively, hidden vector processing module 103 can also capture and mark elements such as "road," "street," and "district" in road signs, so as to obtain a plurality of reference truth labels associated with these words.

In the context of the speed limit signs as an example, the probability that each number appears is not always the same. For example, in practice, there is some prior knowledge that the probability of the numbers "1" and "7" appearing on speed limit signs is much greater than the probability of the numbers "4" and "8" appearing on speed limit signs.

Therefore, hidden vector processing module 103 can predict and analyze the probability that target region data is a certain kind of reference truth label or assign different weights based on the prior knowledge. For example, since the probability that the numbers "1" and "7" appear is much higher than the numbers "4" and "8," hidden vector processing module 103 can set the probability of the target region data being the number "1" or "7" to 30%, and set the probability of the target region data being the number "4" or "8" to 10%. The prior knowledge can be set by a developer or experienced staff based on actual work experience and given different weights.

For example, the experienced staff can give more weight to elements that frequently appear in training, and give less weight to elements that appear less frequently, and the weights can be adjusted in real time along with the changes of used scenarios, conditions, etc.

Additionally or alternatively, hidden vector processing module 103 can also set the probability $$p_c = \frac{N_C}{N}$$

of occurrence of sample data based on actual data distribution of the sample data in a training set, where $p_c$ represents the sample probability, $N_C$ represents sample data distribution, and N represents actual data distribution in the training set.

Image processing model 101 can then combine the probability that hidden vectors belong to each reference truth label, the hidden vectors, and various known or unknown classification algorithms, such as KNN algorithm of GMVAE or Bayesian inference algorithm and CNN to classify the target region, so as to get the conclusion of which label the target region belongs to. For example, in the context of speed limit signs as an example, image processing model 101 can determine that the target region is a number such as "70" or "30."

At block 204, image processing model 101 can obtain a second classification result from another image classification model. The image classification model can be a known or unknown image classification model with different algorithms, processing rules, and architectures from those of image processing model 101, and the present disclosure is not limited in this regard.

At block 205, image processing model 101 can compare the first classification result with the second classification result, and determine the trustworthiness of an image based on the comparison result. For example, in some embodiments, the first classification result from image processing model 101 is "70," and the second classification result from the other image classification model is "20." If the two results are inconsistent, image processing model 101 can determine that the input image has been subjected to an adversarial attack, and the image is untrusted. On the contrary, in some embodiments, if the first classification result is consistent with the second classification result, image processing model 101 may determine that the image is trusted.

Figure 3:
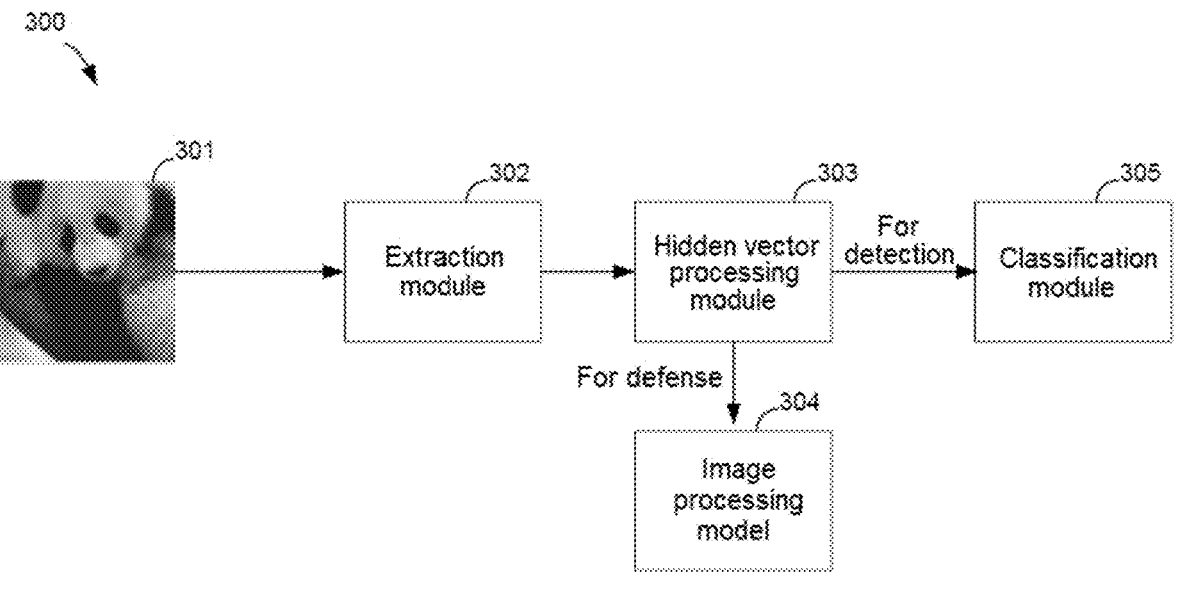
FIG. 3 illustrates a schematic diagram of a system for performing defensive training on image adversarial attacks based on the present disclosure.

FIG. 3 illustrates a schematic diagram of a system 300 for defensive training against image adversarial attacks based on the present disclosure. FIG. 3 includes input image 301, extraction module 302, hidden vector processing module 303, and image processing model 304.

As shown in FIG. 3, input image 301 can be fed into extraction module 302 to remove redundant unnecessary image elements, while making adversarial attacks not have enough features to apply perturbation, and extraction module 302 can be the same module as extraction module 102 in FIG. 1.

Extraction module 302 can then feed an extracted target region to hidden vector processing module 303. In one aspect, hidden vector processing module 303 can extract hidden vectors of the target region and feed the hidden vectors to classification module 305 for further detection. Classification module 305 can be a module with the same function as classification module 104 in FIG. 1. In another aspect, hidden vector processing module 303 can make the target region as close to natural distribution as possible, and feed the result to image processing model 304 for iterative training to perform defensive attack training on image adversarial attacks.

As an example, hidden vector processing module 303 can use data of the target region to improve the training of a deep learning model to enhance its robustness defense, such as designing a training loss function, or regularization, controlling the Lipschitz coefficient of the model, and increasing the norm of the minimum perturbation. In addition, hidden vector processing module 303 can also use a deep generative model to map adversarial samples into real data distribution for defense.

Hidden vector processing module 303 may also add randomness to image processing model 304 based on hidden vectors of a target region and average prediction results of different random models for defense.

Image processing model 304 may be the same model as image processing model 101 in FIG. 1. Additionally or alternatively, image processing model 304 may also be a downstream learning model based on techniques such as ResNet, Inception, and BERT, and the present disclosure is not limited in this regard.

Figure 4:
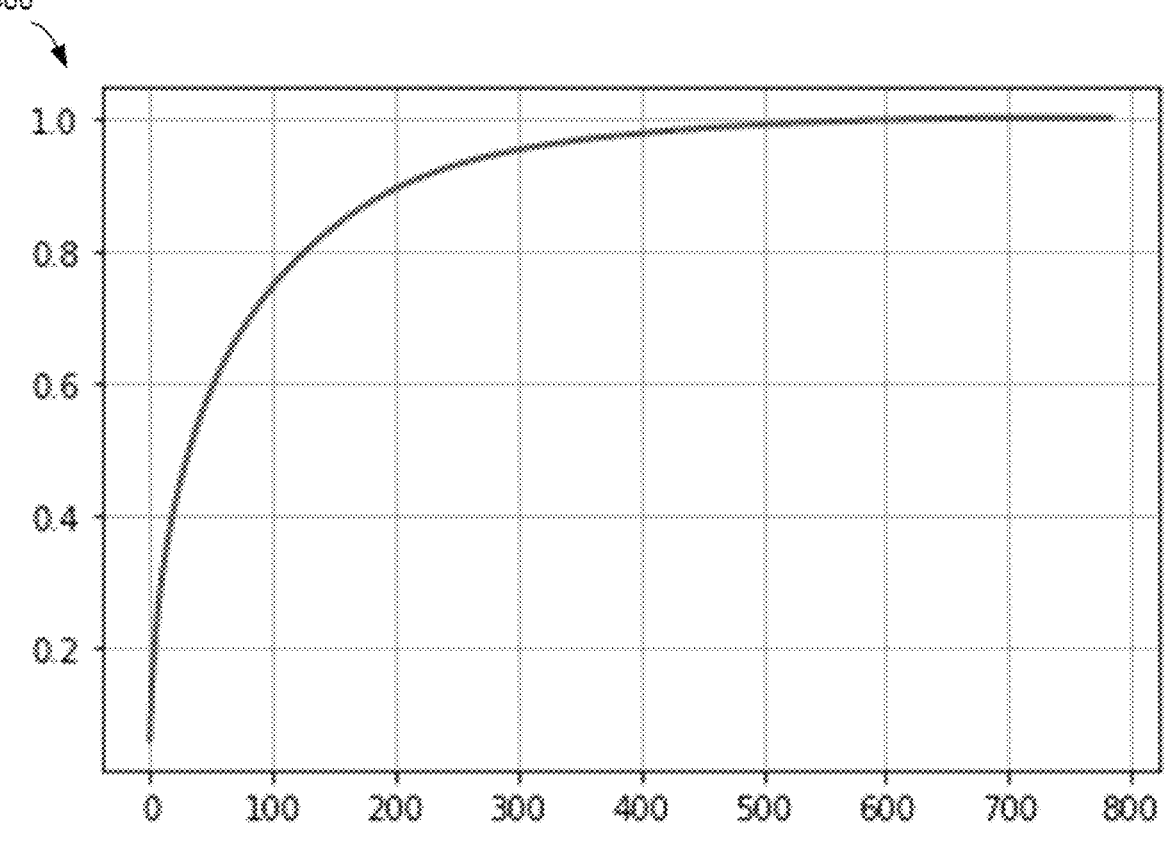
FIG. 4 illustrates a schematic diagram of a relationship between the number of hidden vectors in an extracted target region and the accuracy of judging a trusted image.

FIG. 4 illustrates schematic diagram 400 of the relationship between the number of hidden vectors in an extracted target region and the accuracy of judging a trusted image, where the horizontal coordinate represents the number of hidden vectors in the extracted target region, and the vertical ordinate represents the accuracy of judging a trusted image. As can be seen from FIG. 4, with the increase of the number of hidden vectors in the extracted target region, the accuracy of judging a trusted image is also increasing.

However, after the number of hidden vectors increases to a certain number, the accuracy of judging a trusted image does not improve significantly. For example, in FIG. 4, after 300 hidden vectors are extracted, the accuracy (95%) does not increase significantly. Extracting more hidden vectors means longer processing time. Through the implementation provided by the present disclosure, the balance between accuracy and processing efficiency can be found, and the accuracy can be improved without losing too much processing efficiency.

Figure 5:
FIG. 5 illustrates a schematic diagram of a method for extracting hidden vectors in a target region.
Figure 5:
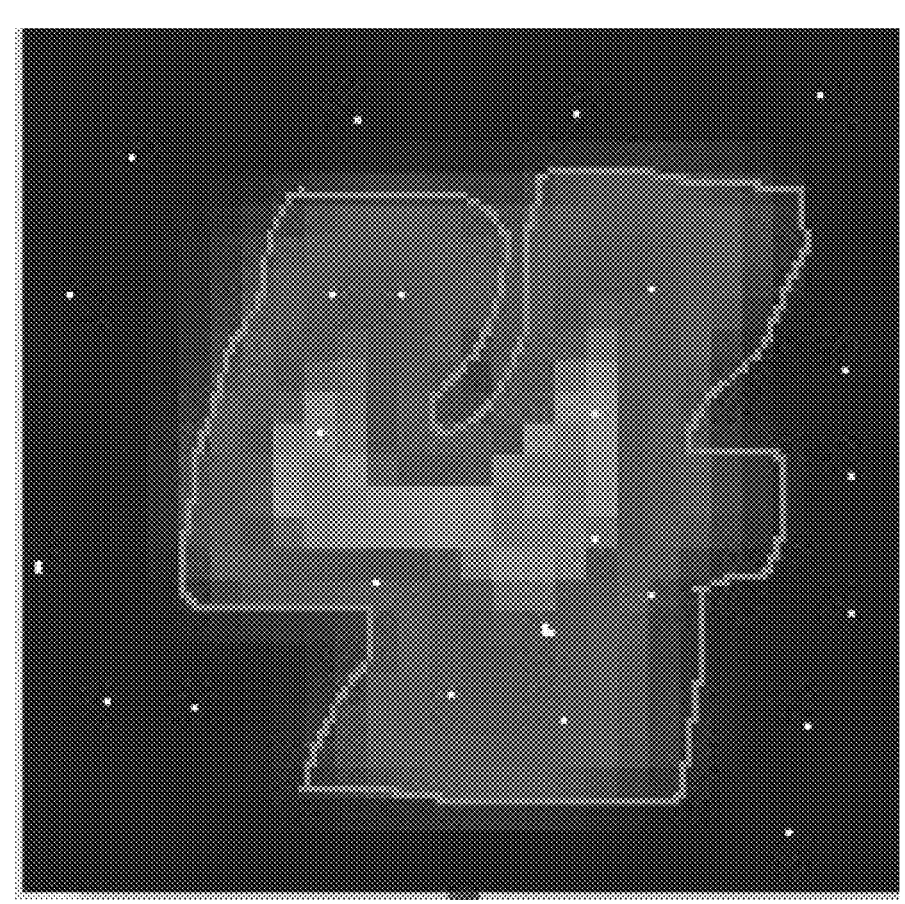

FIG. 5 illustrates schematic diagram 500 of a method for extracting hidden vectors in a target region. As shown in FIG. 5, extraction module 102 can determine the range of a target region to be extracted based on the image processing model type adopted in current image processing model 101 or different types of algorithms.

For example, extraction module 102 can extract all the hidden vectors associated with the number "4" in response to the machine learning model adopted by the image processing model being GMVAE and KNN or Bayesian inference being used. However, in another example, when the method or machine learning model adopted by image processing model 101 is PCA, FA, or AE, extraction module 102 can extract only part of discrete hidden vectors, which can be located in a white box in FIG. 5 and are sufficient to represent an image of the number "4."

Figure 6:
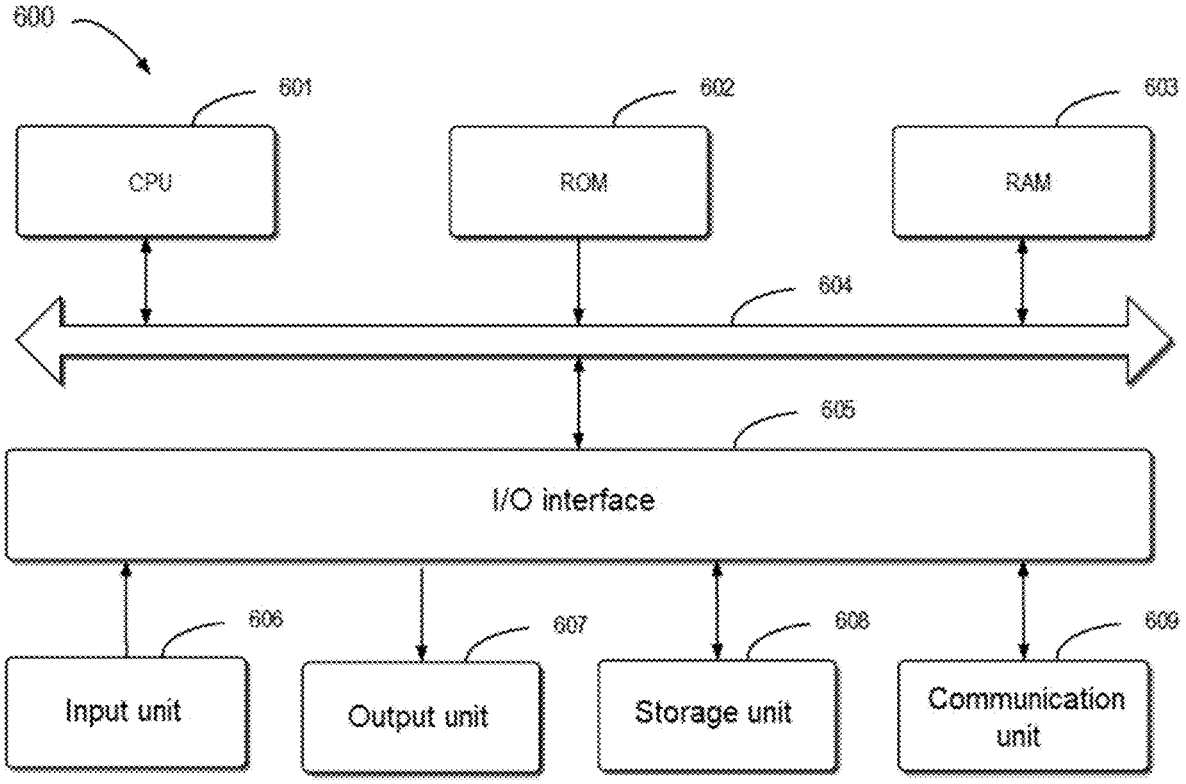
FIG. 6 illustrates a block diagram of an example device suitable for implementing embodiments of the present disclosure.

FIG. 6 illustrates a block diagram of example device 600 that may be used to implement embodiments of the present disclosure. The node in FIG. 1 may be implemented using device 600. As shown in the figure, device 600 includes central processing unit (CPU) 601 that may execute various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various processes and processing described above, such as method 200, may be performed by CPU 601. For example, in some embodiments, method 200 may be implemented as a computer software program that is tangibly included in a machine-readable medium, such as storage unit 608. In some embodiments, part of or all the computer program may be loaded and/or installed onto device 600 via ROM 602 and/or communication unit 609. One or more actions of method 200 described above may be performed when the computer program is loaded into RAM 603 and executed by CPU 601.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network.

The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. An image processing method, comprising:
   extracting a target region in an image;
   determining hidden vectors of the image based on the target region;
   generating a first classification result for the image based on the hidden vectors;
   obtaining a second classification result for the image from an image classification model; and
   determining trustworthiness of the image based on the first classification result and the second classification result;
   wherein generating the first classification result for the image based on the hidden vectors comprises:
   determining label categories to which the hidden vectors belong based on at least a plurality of reference truth labels; and
   classifying the hidden vectors based on the label categories to obtain the first classification result.

2. The method according to claim 1, wherein extracting the target region in the image comprises:
   determining a range of the target region to be extracted based on a type of an image processing model.

3. The method according to claim 2, wherein determining the range of the target region to be extracted based on the type of the image processing model further comprises:

extracting a complete target region in response to the type of the image processing model being based on a deep learning model.

4. The method according to claim 2, wherein determining the range of the target region to be extracted based on the type of the image processing model further comprises:

extracting part of the target region in response to the type of image processing model being based on another type different from a deep learning model.

5. The method according to claim 1, wherein the label categories to which the hidden vectors belong are determined based on the plurality of reference truth labels and prior knowledge.

6. The method according to claim 5, wherein the prior knowledge is obtained by assigning different weights to samples in a training sample set.

7. The method according to claim 1, wherein the plurality of reference truth labels for a training sample set are obtained by capturing and marking feature representations of training samples with the training sample set.

8. The method according to claim 1, wherein determining the trustworthiness of the image based on the first classification result and the second classification result comprises:

comparing the first classification result with the second classification result;

determining that the image is an untrusted image in response to the first classification result being inconsistent with the second classification result; and determining that the image is a trusted image in response to the first classification result being consistent with the second classification result;

wherein comparing the first classification result with the second classification result comprises:

computing matching degree scores of the first classification result and the second classification result with reference truth labels, respectively; and judging whether the matching degree scores reach a matching degree threshold defined by a user.

9. The method according to claim 1, further comprising:

applying the hidden vectors as inputs to an image processing model to further train the image processing model for identifying the target region.

10. A device for image processing, comprising:

at least one processor; and memory coupled to the at least one processor and storing instructions, wherein the instructions, when executed by the at least one processor, cause the device to perform actions comprising:

extracting a target region in an image;

determining hidden vectors of the image based on the target region;

generating a first classification result for the image based on the hidden vectors;

obtaining a second classification result for the image from an image classification model; and determining trustworthiness of the image based on the first classification result and the second classification result;

wherein generating the first classification result for the image based on the hidden vectors comprises:

determining label categories to which the hidden vectors belong based on at least a plurality of reference truth labels; and classifying the hidden vectors based on the label categories to obtain the first classification result.

11. The device according to claim 10, wherein extracting the target region in the image comprises:

determining a range of the target region to be extracted based on a type of an image processing model.

12. The device according to claim 11, wherein determining the range of the target region to be extracted based on the type of the image processing model further comprises:

extracting a complete target region in response to the type of the image processing model being based on a deep learning model.

13. The device according to claim 11, wherein determining the range of the target region to be extracted based on the type of the image processing model further comprises:

extracting part of the target region in response to the type of image processing model being based on another type different from a deep learning model.

14. The device according to claim 10, wherein the label categories to which the hidden vectors belong are determined based on the plurality of reference truth labels and prior knowledge.

15. The device according to claim 14, wherein the prior knowledge is obtained by assigning different weights to samples in a training sample set.

16. The device according to claim 10, wherein the plurality of reference truth labels for a training sample set are obtained by capturing and marking feature representations of training samples with the training sample set.

17. The device according to claim 10, wherein determining the trustworthiness of the image based on the first classification result and the second classification result comprises:

comparing the first classification result with the second classification result;

determining that the image is an untrusted image in response to the first classification result being inconsistent with the second classification result; and determining that the image is a trusted image in response to the first classification result being consistent with the second classification result;

wherein comparing the first classification result with the second classification result comprises:

computing matching degree scores of the first classification result and the second classification result with reference truth labels, respectively; and judging whether the matching degree scores reach a matching degree threshold defined by a user.

18. The device according to claim 10, further comprising:

applying the hidden vectors as inputs to an image processing model to further train the image processing model for identifying the target region.

19. A computer program product, tangibly stored in a non-transitory computer-readable storage medium and comprising machine-executable instructions, wherein the machine-executable instructions, when executed by a machine, cause the machine to perform actions comprising:

extracting a target region in an image;

determining hidden vectors of the image based on the target region;

generating a first classification result for the image based on the hidden vectors;

obtaining a second classification result for the image from an image classification model; and determining trustworthiness of the image based on the first classification result and the second classification result;

wherein generating the first classification result for the image based on the hidden vectors comprises:

determining label categories to which the hidden vectors belong based on at least a plurality of reference truth labels; and classifying the hidden vectors based on the label categories to obtain the first classification result.

20. The computer program product according to claim 19, wherein the label categories to which the hidden vectors belong are determined based on the plurality of reference truth labels and prior knowledge.

\* \* \* \* \*